W. S. HADAWAY, Jr. & E. N. LIGHTFOOT.
ELECTRIC HEATER.
APPLICATION FILED FEB. 6, 1913.
1,145,988.  Patented July 13, 1915.
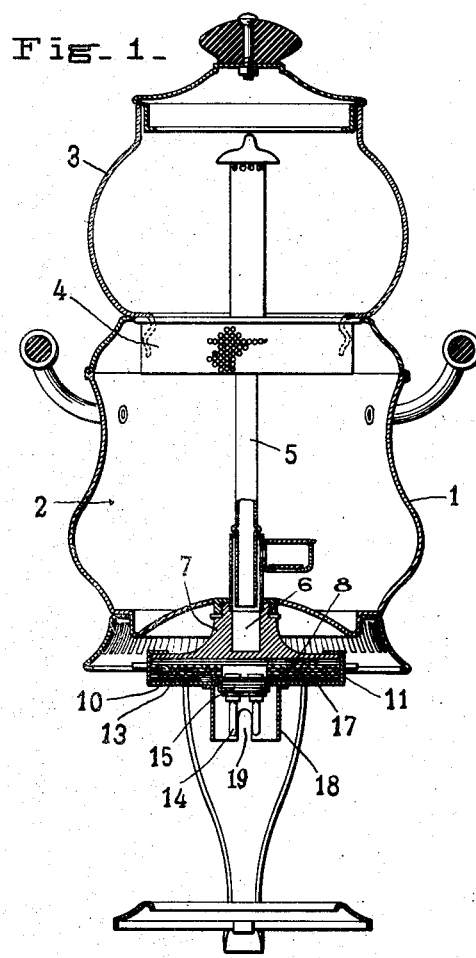
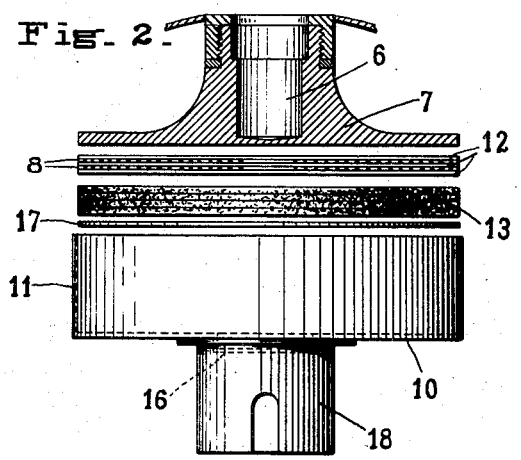
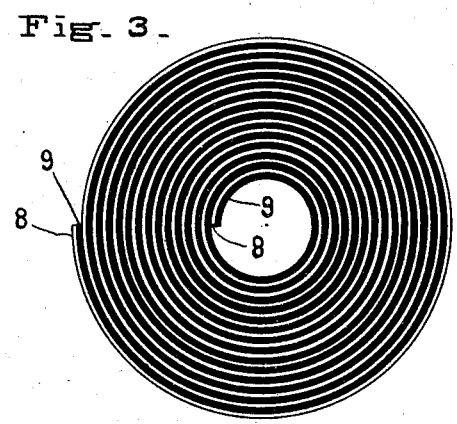
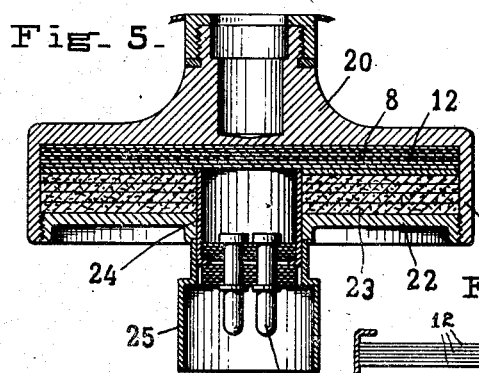
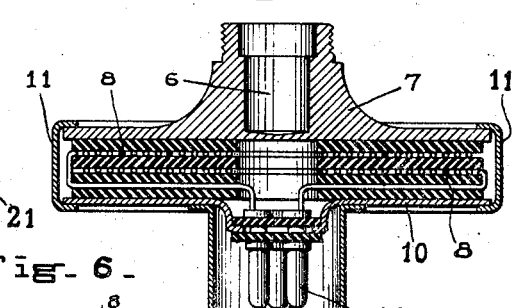
INVENTORS,
William S. Hadaway, Jr.,
& Edwin N. Lightfoot.
WITNESSES:
ATTORNEY

UNITED STATES PATENT OFFICE.

WILLIAM S. HADAWAY, JR., OF NEW ROCHELLE, AND EDWIN N. LIGHTFOOT, OF NEW YORK, N. Y.

ELECTRIC HEATER.

1,145,988.     Specification of Letters Patent.     Patented July 13, 1915.

Application filed February 6, 1913. Serial No. 746,512.

*To all whom it may concern:*

Be it known that we, WILLIAM S. HADAWAY, Jr., and EDWIN N. LIGHTFOOT, citizens of the United States, residing, respectively, at New Rochelle, in the county of Westchester, and at New York, in the county of New York, both in the State of New York, have invented new and useful Improvements in Electric Heaters, of which the following is a full, clear, concise, and exact description, reference being had to the accompanying drawing, forming a part of this specification.

This invention relates to improvements in electric heaters.

One of the objects of the invention is to provide a heating unit which may be readily applied to various electric heating appliances without modifying the existing construction thereof.

Another object is to provide improved means for securing an electrical resistance to the base of electric appliances in such a manner as to localize the heat or confine it mainly to a small area.

A further object is to provide an electric heater in the form of an attachment which, when applied to the device to be heated, is neat, compact, unobtrusive and does not detract from the appearance of said device.

In the accompanying drawings we have illustrated several forms of heaters which embody our invention. To aid in an understanding of said heaters we have shown them as constructed with particular reference to their use in connection with coffee percolators, the latter being good examples of the class of utensils or appliances for which said heaters are adapted.

The invention is not limited to the embodiments illustrated, nor to their use in connection with percolators.

Figure 1 is a sectional elevation of a coffee percolator showing an electrical heating unit assembled as a permanent part thereof. Fig. 2 is a view on an enlarged scale showing the electrical resistance and its adjuncts by which it is attached to and insulated from the base of the percolator, the adjacent parts being spaced apart to disclose the manner of assembling. Fig. 3 is a bottom, plan view of the resistor. Fig. 4 is a sectional elevation of a modified arrangement for securing the resistor to the base of the percolator. Fig. 5 is a further modification thereof. Fig. 6 is an elevation of a modified terminal mounting.

The coffee percolator 1 illustrated in the drawings is of standard design and it need not be specifically described except to state briefly that it comprises a lower receptacle 2 which initially contains water, an upper chamber 3, an intermediate coffee receptacle or tray 4, and a tube 5 passing through the base of the lower receptacle and communicating with a well 6 in the base plate or heating plate 7. Such bases have heretofore been heated by an alcohol lamp, whereupon steam forms in the well and some of the liquid is expelled through suitable openings in the top of the tube 5, and trickling through the coffee receptacle is returned to the lower chamber from which the liquid coffee is eventually drawn off. In order to heat said base plate 7 electrically and without modifying the construction of the percolator, we provide a suitable resistor or resistors 8 which in the present instance have the form of a wire wound spirally, the adjacent turns being separated by an asbestos string 9. The resistors, of which there are preferably two separated by a layer of mica, may, of course, assume various other forms, the one described being particularly convenient and adapted for use with a round heating plate. In order to suitably support and protect said resistors and hold them in close thermal relation with said heating plate, we provide a circular metal receptacle or carrier 10 having an annular flange 11 projecting therefrom. Said flange is of sufficient diameter to fit over the base plate 7, and is spun over the same, the resistors 8 being received within said carrier and insulated therefrom and also from said base by mica disks 12 arranged on opposite sides thereof. To minimize downward radiation of heat, we provide a non-conducting disk 13 which fits within said casing in the manner indicated. The relative arrangement of the parts is clearly shown in Fig. 2, said parts being held against the base by the bending in or spinning over of the upper part of the flange 11 as indicated in Fig. 1. The resistors are thereby held very close to the lower surface of the heating plate 7, being separated therefrom only by a few thicknesses of mica. Accordingly most of the heat is transferred or communicated to the heating plate 7, and localized or concentrated about the well 6, downward radiation being cut off by the disk 13. The inwardly bent flange 11 firmly secures all the parts in position and renders the heating unit as a whole a unitary part of the percolator. Said unit is also water-tight. The desired pressure is applied to the resistors, the latter being also held in position by the carrier. The said heating unit is comparatively thin and inconspicuous and in no way detracts from the appearance of the device as a whole.

Suitable circuit terminals 14 are provided which are supported by the carrier 10 but insulated therefrom by mica washers 15 arranged on opposite sides of a horizontal lip or flange 16. The upper ends of said terminals of which there are preferably three, pass through openings in an additional mica disk 17 which rests against the base of said carrier. Said terminals are flanged over as indicated and are thereby permanently secured to the heating unit. The inner and outer ends of the spiral resistance wires 8 are brought down and suitably connected to said terminals. Said terminals project downwardly and are protected and partially surrounded by a housing or casing 18, said housing having its upper end flanged outwardly and suitably secured to the carrier 10. One method of securing it is to electrically weld it thereto. A notch 19 in said housing insures the proper relative circuit connections when the necessary attachment plug is inserted therein. The terminals are elevated sufficiently to permit ready attachment of a plug from beneath. If a low stand is employed, is is preferable to attach and detach the plug by a movement in a horizontal plane. An arrangement of horizontal terminal pins is shown in Fig. 6 and hereinafter described.

In Fig. 4, we have illustrated a modified form of heater in which the carrier or disk 10 is secured by a separate independent flange 11, the latter being spun over both at the bottom and at the top. The remaining elements are the same as those previously described.

In Fig. 5, we have illustrated a further modification, many of the elements of which are similar to those previously described, and accordingly the same reference characters have been applied to indicate corresponding parts. The base plate 20 in this case, however, is provided with a downwardly extending flange 21, within which is received a cover plate 22, having screw-threaded engagement therewith. Said cover plate consists of a sheet metal disk having a central opening within which a tubular extension 24 is secured, preferably by welding it thereto to form a unitary device. The lower end of said extension is flanged inwardly to support the terminal members which are secured thereto in a manner similar to that previously described. An additional inclosing casing 25 is provided having a contracted upper portion which fits over said extension 24 and is suitably secured in position after the parts have been assembled.

In Fig. 6, we have illustrated a construction permitting a horizontal arrangement of the terminal pins thereby permitting the body of the utensil to be mounted on a lower base. The carrier 10 is provided preferably with radial reinforcing ribs 26 struck therefrom. A rectangular metallic tube 27 is supported centrally from said disk and is cut away diagonally, the opening being closed by the plate 28. A flange 29 is formed on one side of said tube, on the opposite side of which flange mica washers are arranged in the manner previously described, said washers supporting the terminal pins 14 in a horizontal position.

In the various forms of device previously described it is desirable in most cases to have the resistance element made up of two spiral resistors such as shown in Fig. 3, and to provide three terminal pins. The inner ends of both coils are connected to one terminal pin and the outer ends thereof are connected to the other two terminal pins. The resistors are of unequal resistance whereby two different heats may be obtained by using either resistor, separately. By connecting both resistors in parallel a third heat is obtained. The change in circuit connections is effected by a suitable controller, not shown.

It is to be understood, of course, that the invention is not to be limited to the several forms thereof illustrated and described, as various other embodiments may be devised which fall within the scope of the claims.

What we claim as new and desire to secure by Letters Patent is:

1. In an electrical heating device, a base plate, a resistance adjacent to the under surface thereof, a sheet metal carrier having an annular flange conforming to the contour of said base plate, said annular flange being bent over the outer upper surface of said base plate to secure said resistance in close thermal contact with said base plate.

2. In combination, a heating plate having a central well for the liquid to be heated, a resistance for heating said base plate, a metallic carrier for said resistance, and means for insulating said resistance from said base plate and from said carrier, the latter having means flanged over said base plate to hold said carrier and said resistance firmly against said base plate.

3. In combination, a heating disk having a central supporting boss with an opening therein for the liquid to be heated, a cup-shaped sheet metal carrier having a flange within which said disk is received, the upper margin of said flange being bent over said disk to lock the parts together, a resistance arranged between said carrier and said disk, insulation on opposite sides of said resistance, and heat insulating material between said resistance and said carrier.

4. The combination with a liquid receptacle having a base with an opening therein, of a heating plate therefor, said plate being secured to said base and having an opening registering with the opening in said base, an electrical resistance in the form of a thin, flat element arranged beneath said plate, and terminal members arranged beneath said resistance and supported by said plate.

5. The combination with a heating disk for liquids, of means for supporting said disk at an intermediate portion of its upper surface thereby leaving a free outer margin, flat resistance coils arranged against the under surface of said disk, means for preventing downward radiation of heat from said coils, and means depending from said outer margin for securing said coils in close heat conduction relation with said disk.

6. The combination with a heating disk for liquids, of means for supporting said disk at an intermediate portion of its upper surface thereby leaving a free outer margin, flat resistance coils arranged against the under surface of said disk, an annular flange depending from said outer margin, a plate connected to the lower end of said flange to form with said base, an inclosure for said resistance coils, circuit terminals supported by said plate, and connections from said circuit terminals to said coils to permit connection thereof either in series or parallel.

7. A resistance carrier for a percolator comprising a cup-shaped element having a central opening and a cylindrical element concentric with said opening and integrally united to said carrier.

8. A resistance carrier for a heating device comprising a metallic plate having a peripheral flange for securing said plate to the object to be heated, said plate having a central opening, circuit terminals arranged in said opening and supported by said plate but out of contact electrical therewith, and a metallic housing secured to said plate and surrounding said terminals.

In witness whereof, we have hereunto subscribed our names in the presence of two witnesses.

WILLIAM S. HADAWAY, Jr.
EDWIN N. LIGHTFOOT.

Witnesses:
   GEORGE J. MALLON,
   G. P. BROCKWAY.